(12) United States Patent
Petit et al.

(10) Patent No.: US 8,390,579 B2
(45) Date of Patent: Mar. 5, 2013

(54) SYSTEM FOR CLASSIFYING GESTURES

(75) Inventors: Eric Petit, St. Martin d'Heres (FR); Christophe Maldivi, Grenoble (FR)

(73) Assignee: France Telecom, Paris (FR)

( * ) Notice: Subject to any disclaimer, the term of this patent is extended or adjusted under 35 U.S.C. 154(b) by 408 days.

(21) Appl. No.: 12/396,591

(22) Filed: Mar. 3, 2009

(65) Prior Publication Data
US 2009/0231295 A1   Sep. 17, 2009

(30) Foreign Application Priority Data
Mar. 14, 2008   (FR) ...................... 08 51687

(51) Int. Cl.
G06F 3/041   (2006.01)
G06F 3/033   (2006.01)

(52) U.S. Cl. ........................ 345/173; 715/863

(58) Field of Classification Search ............ 345/173; 715/863
See application file for complete search history.

(56) References Cited

U.S. PATENT DOCUMENTS

| | | | |
|---|---|---|---|
| 2003/0043174 A1 | 3/2003 | Hinckley et al. | |
| 2003/0055644 A1* | 3/2003 | Johnston et al. | 704/251 |
| 2004/0143796 A1* | 7/2004 | Lerner et al. | 715/538 |
| 2005/0088420 A1 | 4/2005 | Dodge et al. | |
| 2006/0055685 A1 | 3/2006 | Rimas-Ribikauskas et al. | |
| 2007/0064004 A1* | 3/2007 | Bonner et al. | 345/442 |

* cited by examiner

Primary Examiner — Joseph Haley
Assistant Examiner — Nicholas Lee
(74) Attorney, Agent, or Firm — Drinker Biddle & Reath LLP

(57) ABSTRACT

A system for classifying gestures executed by a user on a surface or in a graphical interface comprising a meta-classification module which analyzes kinematic and spatial characteristics of an arbitrary gesture undergoing execution and assigns a class of synchronous or asynchronous gestures to this gesture.

4 Claims, 4 Drawing Sheets

SYSTEM FOR CLASSIFYING GESTURES

CROSS-REFERENCE TO RELATED PATENT APPLICATION

This application claims the benefit of French Patent Application No. 08 51687, filed on Mar. 14, 2008 in the French Institute of Industrial Property, the entire contents of which is incorporated herein by reference.

BACKGROUND OF THE INVENTION

The present invention appertains to the field of gestural interactions. Gestural interactions are based on interpreting the gestures performed by a user on a touch-sensitive surface or in a graphical interface. The surface or the graphical interface can be that of a mobile tablet, PDA (for Personal Digital Assistant), mobile terminal, micro-computer, etc.

On a surface, a gesture can be performed with a finger or a stylus. In a graphical interface, a gesture can be performed by way of a pointing peripheral such as a mouse or a touchpad.

A gesture corresponds to a continuous physical action. A gesture begins, for example, when the user touches a surface with a finger, continues when the user slides his finger over the surface and finishes when the user lifts the finger. For a pointing peripheral such as a mouse, the gesture begins when the user presses a button on the mouse and finishes when this button is released.

A gesture is defined by a trajectory parametrized over time and in Cartesian space (abscissa, ordinate) or possibly in a larger space including other parameters such as for example the pressure or the angle of the gesture.

Two categories of gestures are distinguished:
asynchronous gestures,
synchronous gestures.

In the case of asynchronous gestures, the trajectory of the gesture is interpreted globally, as a graphical shape, and determines a command to be executed. This command to be executed usually corresponds to a keyboard shortcut, that is to say to a combination of keys which once depressed run a function. This command can also correspond to the execution of a program.

For example, in certain applications using Windows (trademark) as operating system, it suffices to draw an upward stroke in order to copy, a downward stroke to paste, a U from left to right to cancel an action, a U from right to left to restore an action, a W on the desktop to run Word (trademark), an N to create a new document, an S to save, etc.

The graphical shapes thus recognized and associated with a command belong to a finite set. These shapes are generally complex and often inspired by hand-written characters.

The execution of the command associated with the shape of the gesture is performed only at the end of the gesture, once the shape has been recognized, hence the concept of asynchronous gesture.

A synchronous gesture corresponds to a direct action on objects situated on a surface or in a graphical interface. Action is understood to mean, for example, a selection, a displacement such as a "drag and drop", a modification of appearance such as a zoom, or indeed the drawing of an object. By way of examples, the term object denotes an icon, a menu, a file, a Web page, a multimedia content, etc. This type of gesture generally involves a pointing peripheral.

In the case of the displacement of an object such as a "drag and drop", the action begins with the selecting of the object by pressing a button on the pointing peripheral. Then, keeping the button of the pointing peripheral pressed, the action continues with the displacing of the object on the surface or in the graphical interface. The action terminates when the button of the pointing peripheral is released.

Usually, only the instantaneous position of the pointing peripheral is interpreted, in particular the start and the end of the gesture. The global shape of the trajectory is not recognized.

The action on the object is immediately visible, hence the concept of synchronous gesture.

It is rare to have applications which implement gestural interactions based both on asynchronous gestures and on synchronous gestures.

Nevertheless, when such applications exist, for one and the same surface or for one and the same graphical interface, the user must act so as to explicitly mark the change of category of gesture, thereby complicating his task. Usually, this action requires that a button be kept in the depressed position on the surface or on the pointing peripheral.

In patent application US2006055685, the authors attempt to solve this problem by proposing a particular set of asynchronous gestures, that is to say gestures corresponding to commands to be executed. These gestures are designated by the expression "flick gestures" in the document.

From among the asynchronous gestures, this solution retains only gestures which are simple and easy to recognize in a graphical interface implementing a pointing peripheral. Specifically, instead of having a complex specific shape associated with a command, each gesture of the set of "flick gestures" is characterized by a rectilinear shape and a high execution speed. Thus, the recognition of such a gesture and the distinguishing of such a gesture from a synchronous gesture are based mainly on a speed criterion. Additionally, it is no longer the shape of the gesture which determines the command associated with this gesture but its direction, the latter being rectilinear. There are as many commands as directions defined by the system.

This solution exhibits the drawback of limiting the number of possible asynchronous gestures and therefore the number of associated commands.

The use of the direction criterion to determine a command is rather impractical for a user in a situation of mobility on account of the rather imprecise orientation of the terminal assumed to be held in the hand.

The use of the direction criterion demands greater visual attention on the part of the user while a criterion based on shape is less constraining.

Consequently, despite the solution proposed in patent application US2006055685, the requirement still exists to be able to combine synchronous gestures and asynchronous gestures in one and the same application, without constraint for the user and while preserving the richness of representation of the asynchronous gestures.

SUMMARY OF THE INVENTION

Thus, the present invention relates, according to a first aspect, to a system for classifying gestures executed by a user on a surface or in a graphical interface comprising a meta-classification module which analyzes kinematic and spatial characteristics of an arbitrary gesture undergoing execution and assigns a class of synchronous or asynchronous gestures to this gesture.

The system makes it possible to classify an arbitrary gesture, consequently, it allows the execution of any gesture by a user and does not constitute any constraint in respect of said user. The system allows the user to execute synchronous and asynchronous gestures without him having to indicate the nature of the gesture that he is about to execute.

According to a preferred characteristic, the class of asynchronous gestures comprises a class of symbolic gestures.

According to a preferred characteristic, a symbolic gesture comprises at least one curvature or at least one angle and has an initial speed greater than a predetermined threshold.

Thus, the system makes it possible to classify a gesture which takes any shape, such as especially a symbolic shape that the system is capable of identifying. In fact, this system makes it possible to obtain enriched gestural interaction.

According to a preferred characteristic, the gesture classification system furthermore comprises a module for classifying shapes making it possible to associate a symbol with a symbolic gesture, said symbol corresponding to a command to be executed on the surface or in the graphical interface.

The association of a meta-classification module and of a shape classification module makes it possible to separate the various classes of synchronous and asynchronous gestures, thus permitting the recognition of symbolic gestures.

According to a preferred characteristic, the meta-classification module is a finite state automaton.

According to a preferred characteristic, a state of the finite state automaton corresponds to a portion of the gesture undergoing execution at a given instant.

According to a preferred characteristic, the finite state automaton comprises a transient state corresponding to insufficient information about the gesture undergoing execution.

The finite state automaton embodying the meta-classification module allows faster classification of the gesture. It possesses a transient state termed "analysis". By virtue of this state, it can wait for additional information when the information allowing the classification of the gesture is not sufficient.

The invention also relates to a method of classifying gestures executed by a user on a surface or in a graphical interface comprising a meta-classification step comprising the analysis of kinematic and spatial characteristics of an arbitrary gesture undergoing execution and the assignment of a class of synchronous or asynchronous gestures to this gesture.

The method exhibits the same advantages as the system described above.

The invention also relates to a computer program product comprising program instructions for the execution of the previously described method of classifying gestures.

The invention also relates to a terminal comprising a system, such as described above, for classifying gestures.

BRIEF DESCRIPTION OF THE DRAWINGS

The invention will be better understood in the light of the description which follows of a particular embodiment of a system for classifying gestures according to the invention, with reference to the appended drawings for which.

DETAILED DESCRIPTION OF THE INVENTION

The aim of the system for classifying gestures according to the invention is to allow a user to use asynchronous gestures to carry out commands and equally to use synchronous gestures to manipulate objects situated on one and the same surface or in one and the same graphical interface.

The user's gestures can be arbitrary in their shape, their direction, their speed, their pressure or any other characteristic of a gesture.

Figure 1:
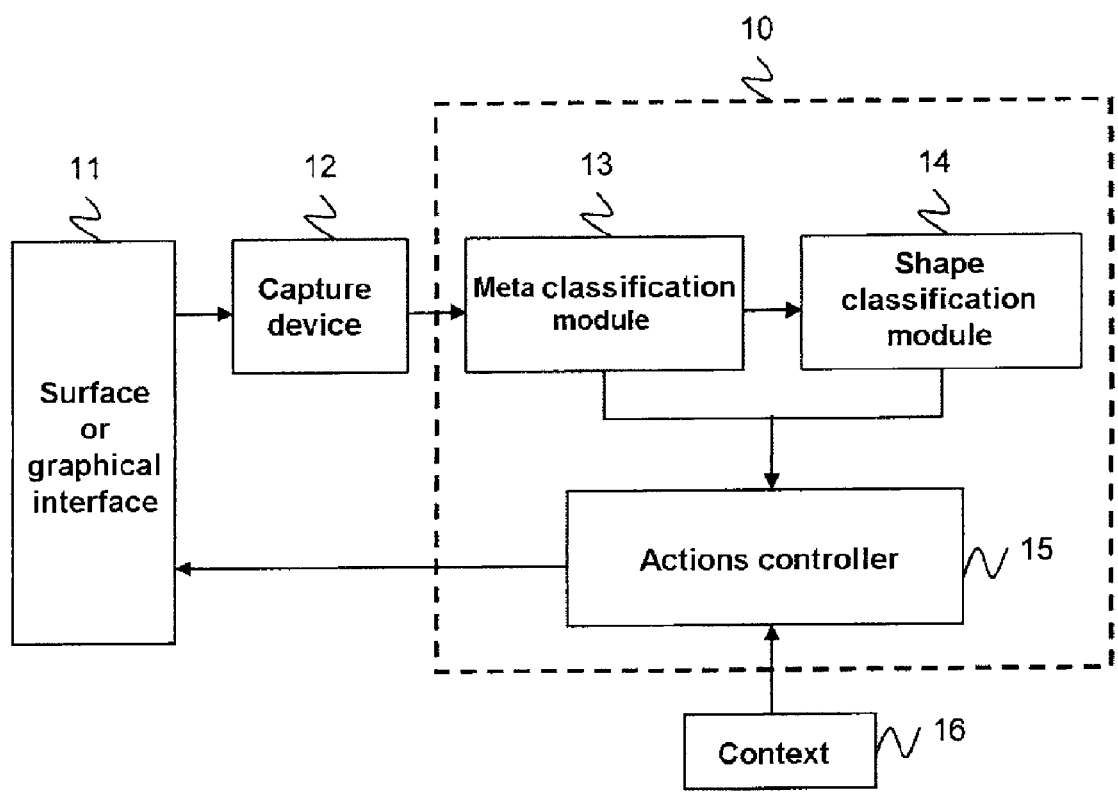
FIG. 1 represents an example of a system for classifying gestures according to the invention.

FIG. 1 represents an example of a system 10 for classifying gestures according to the invention.

A user executes a gesture on a surface or in a graphical interface 11. This gesture is performed with a finger, a stylus, etc., or by way of a pointing peripheral.

The role of a capture device 12 is to capture in real time the gesture undergoing execution.

The system 10 for classifying gestures comprises a meta-classification module 13.

The role of the meta-classification module 13 is to analyse in real time the trajectory of the gesture undergoing execution captured by the capture device 12. The objective of this analysis is to determine to which class of synchronous gestures or of asynchronous gestures the gesture undergoing execution belongs.

For this purpose, various classes of synchronous or asynchronous gestures are defined corresponding, for example, to:
a prolonged regular movement (class $C_1$),
a rectilinear fast movement (class $C_2$),
a rotational movement to the left (class $C_3$),
a rotational movement to the right (class $C_4$),
a symbolic gesture (class $C_5$).

Other classes of synchronous or asynchronous gestures can also be defined, corresponding, for example, to a simple press, a prolonged press, a brief and short movement, etc. Thus, the examples of classes above are given by way of illustration and are not limiting of the invention.

In the subsequent description, for simplicity, only classes $C_1$ to $C_5$ are used.

A symbolic gesture is characterized by the fact that it possesses a high initial execution speed, greater than a predetermined threshold, with a positive acceleration at the outset. A symbolic gesture also has a shape exhibiting either at least one curvature (the letter "S" possesses two curvatures) or at least one angle (the sign "<" possesses one angle, the letter "W" possesses three angles).

The detection of an angle relies on an assumption according to which, on passing an angle, the curvilinear speed drops before increasing again.

Figure 2:
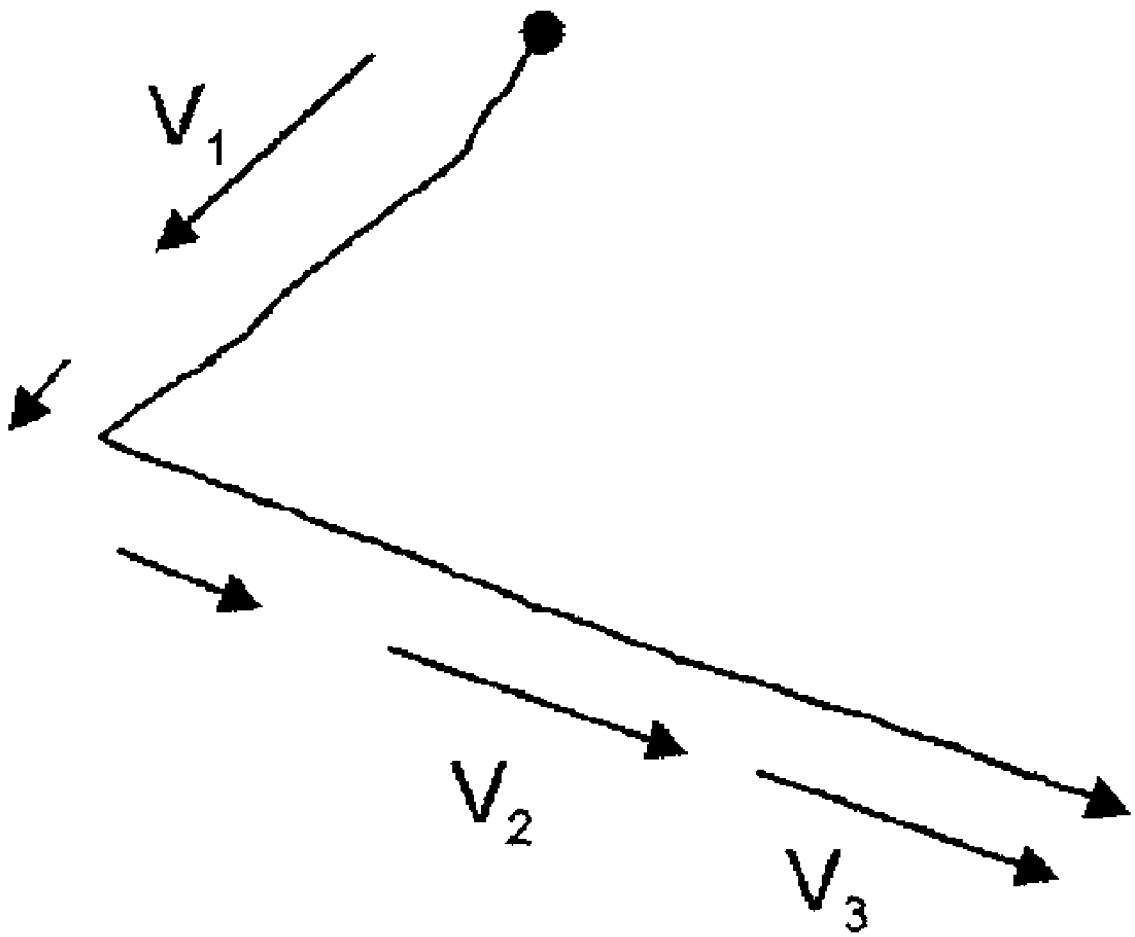
FIG. 2 illustrates an example of detecting an angle.

FIG. 2 illustrates an example of detecting an angle.

In tandem with the gesture, the speed vectors whose modulus is greater than a certain threshold are stored, i.e., with reference to FIG. 2, the vectors $V_1$, $V_2$, and $V_3$.

On passing the angle, there are therefore 2 consecutive vectors ($V_1$ and $V_2$) representative of the direction of the movement, before and after the angle.

The scalar product of the normalized, consecutive vectors should be calculated in order to obtain a reliable measure of the angular variation, and a conclusion should be reached regarding the absence or presence of an angle.

Classes $C_1$, $C_3$ and $C_4$ correspond to synchronous gestures. The action which results from a gesture belonging to one of these classes and applied to an object, situated on the surface or in the graphical interface 11, is immediately or almost immediately visible.

Classes $C_2$ and $C_5$ correspond to asynchronous gestures. A set of commands is associated respectively with class $C_2$ and with class $C_5$. The commands associated with the gestures of class $C_2$ correspond, for example, to the shift arrows of a micro-computer keyboard or to the dispatching of a succession of positions on a surface or in a graphical interface. Class $C_5$ corresponds to symbolic gestures. The commands associated with the gestures of class $C_5$ are specific commands and correspond, for example, to keyboard shortcuts, to commands for opening or closing an application, for saving, etc.

The meta-classification module 13 makes it possible to obtain a set of kinematic characteristics (speed, acceleration) and spatial characteristics (start and end position, successive positions, centre of the rotation, etc.) as well, possibly, as other parameters of the gesture such as the pressure.

The determination of the class to which a gesture undergoing execution belongs, performed by the meta-classification module 13, is based on the kinematic and spatial characteristics thus obtained.

For the classes $C_1$ to $C_5$ identified, the main kinematic and spatial characteristics of the gestures corresponding to these classes are the following:

for class $C_1$, that is to say corresponding to a prolonged regular movement, the gestures are slow (of low speed, of low acceleration becoming negative), of prolonged duration and of indeterminate shape, for class $C_2$, that is to say corresponding to a rectilinear fast movement, the gestures are fast (of high acceleration), of brief duration and of quasi-rectilinear shape, for classes $C_3$ or $C_4$, that is to say corresponding to a rotational movement to the left or to the right, the gestures are more or less curved at the outset with a low or high acceleration, transforming into a fairly fast rotation to the left or to the right, then possibly becoming slow, for class $C_5$, that is to say corresponding to a symbolic gesture, the gestures are fast, in a single stroke, of brief duration and their shape exhibits one or more curvatures or else one or more angles.

The meta-classification module 13 determines as early as possible the class to which the gesture in progress belongs. This constraint is particularly strong when the gesture is synchronous and induces an action on an object situated on the surface or in the graphical interface. Specifically, in this case, it is vital that the classification of the gesture be done in the briefest timescales so as to guarantee the synchronous effect between the movement of the finger, of the stylus or else of the pointing peripheral and the visible modification of the object on the surface or in the graphical interface. It is for this purpose that the meta-classification module 13 analyzes the gesture in tandem with its execution without waiting for the end of the latter.

One of the 5 classes $C_1$ to $C_5$ previously identified to which the gesture undergoing execution belongs is therefore obtained at the output of the meta-classification module 13, together with kinematic and spatial characteristics of this gesture.

With reference to FIG. 1, the system 10 for classifying gestures comprises a shape classification module 14.

When class $C_5$, that is to say the class of a symbolic gesture, is obtained at the output of the meta-classification module 13, the class and the trajectory of the complete gesture captured are transmitted to the shape classification module 14.

The role of this shape classification module 14 is to recognize the global trajectory of the gesture in a set of possible trajectories called symbols and to identify the symbol associated with the complete gesture.

In a particular embodiment of the invention, the shape classification module 14 is a shape recognition algorithm which is based on an HMM (Hidden Markov Model) approach and on a representation of the gesture using a collection of graphical primitives. This algorithm outputs the recognized symbol and also a similarity score associated with this symbol.

As a variant, the shape classification module 14 is a shape recognition engine that is able to implement techniques such as neural nets, fuzzy logic, Bayesian networks, etc.

The system 10 for classifying gestures comprises an actions controller 15.

The role of the actions controller 15 is to associate and to execute an action appropriate to the gesture executed as a function of predefined rules.

These rules depend on the input data of the actions controller 15 such as the class and the kinematic and spatial characteristics of the gesture originating from the meta-classification module 13 or such as the symbol originating from the shape classification module 14.

These rules also depend on the context 16.

The context 16 can be of various types such as for example: spatial, temporal, application related, user related, etc.

By way of example, in the case of a synchronous gesture, the action can consist, for example, in displacing an image, in having an effect of continuous enlargement (positive zoom) or continuous reduction (negative zoom) of an object (of an image or of a document).

Still by way of example, in the case of an asynchronous gesture, the command associated with the gesture can correspond to the pressing of a standard keyboard key such as, for example, a navigation arrow, and the corresponding action can consist in navigating around a Web page.

In the case of a symbolic gesture, the actions controller 15 performs the association between the recognized symbol and the corresponding specific command which can involve an action consisting, for example, in going to a Web page, in opening an application, etc. The actions controller 15 can also, as the case may be, reject the gesture. This case can arise especially when the similarity score associated with the symbol does not exceed a predetermined threshold.

In a particular embodiment of the invention, the meta-classification module 13 is a state machine of the finite state automaton type.

The behaviour of a finite state automaton is determined by the choice of the states and of their connections and by the transition conditions, that is to say the conditions for switching from one state to another.

In the finite state automaton embodying the meta-classification module 13 of the invention, a state characterizes a portion of the gesture undergoing execution at a given instant.

In a particular embodiment of the invention, the following states have been defined:

$E_1$—ready: the system is ready and on standby awaiting a gesture,
$E_2$—movement: the start of a gesture is detected,
$E_3$—analysis: a gesture is undergoing analysis,
$E_4$—regular movement: the gesture is regular (quasi-uniform speed),
$E_5$—rectilinear fast movement: the gesture is fast and quasi-rectilinear,
$E_6$—fast curved movement: the gesture is curved and fast,
$E_7$—gyratory movement to the left: the gesture rotates to the left,
$E_8$—gyratory movement to the right: the gesture rotates to the right,
$E_9$—end of gesture: the end of the gesture is detected.

The finite state automaton used can comprise more or fewer states than those defined hereinabove. Thus, the above states are given by way of illustration and are not limiting of the invention.

The state $E_3$ (analysis) is a transient state which conveys the fact that the information available about the gesture undergoing execution at a given instant is not sufficient.

The time spent in the state $E_3$ (analysis) is therefore variable.

The behaviour of a finite state automaton is in part determined by the connections between states. Not all the states are connected together. The connections are oriented from one state towards another state.

Thus, for example, in the finite state automaton embodying the meta-classification module 13 of the invention, the state $E_1$ (ready) and the state $E_6$ (regular curved movement) are not connected. The state $E_9$ (end of gesture) is connected to the state $E_1$ (ready) but the inverse connection is not valid.

The set of states and connections between states defines the topology of the finite state automaton.

The analysis of the trajectory of a gesture corresponds to a series of states. The series of states determines the class obtained at the output of the meta-classification module 13.

A series of states begins with a state termed the "ready state" and terminates with an "end of gesture" state.

The switch from one state to another state takes place when there exists a connection between these two states and when it is oriented in the sense of the switch.

The switch from one state to another state is made according to a condition termed the transition condition $t_n$, with n varying from 1 to N, N being the total number of transitions.

A transition condition depends on the kinematic and spatial characteristics of the gesture considered.

The class assigned at the output of the meta-classification module 13 can, optionally, be modified repeatedly in the course of the execution of the gesture, according to the evolution of the series of states. These modifications at output depend on the series of states, that is to say the successively activated states, and the classification rules applied. The actions controller 15 takes these modifications into account by applying its own rules.

By way of nonlimiting examples of the invention, here are a few classification rules applied by the state automaton:
- class $C_1$ is assigned to the output of the meta-classification module 13 as soon as the latter switches to the state $E_4$ (regular movement),
- class $C_2$ is assigned to the output of the meta-classification module 13 only in the state $E_9$ (end of gesture) and when the series of states corresponds to a high acceleration of the gesture without curvature (example: $E_1 \rightarrow E_2 \rightarrow E_5 \rightarrow E_9$) or to a regular increase in the speed of the gesture without curvature (example: $E_1 \rightarrow E_2 \rightarrow E_3 \rightarrow E_5 \rightarrow E_9$),
- classes $C_3$ and $C_4$ are assigned to the output of the meta-classification module 13 when, for example, there is succession of the switch to the state $E_6$ (fast curved movement) and of the switch to the state $E_7$ (gyratory movement to the left) for class $C_3$ or of the switch to the state $E_8$ (gyratory movement to the right) for class $C_4$,
- class $C_5$ is assigned to the output of the meta-classification module 13 only in the state $E_9$ (end of gesture) and when, for example, there is a switch (optionally repeated) from the state $E_5$ (rectilinear fast movement) to the state $E_6$ (fast curved movement).

When the gesture is synchronous, a class is assigned to the output right from the first changes of states of the automaton. This pertains to classes $C_1$, $C_3$ and $C_4$, relating to regular or rotational movements.

In the case of asynchronous gestures, a class is assigned to the output when the automaton is in the "end of gesture" state. This pertains to classes $C_2$ and $C_5$. If the gesture is a symbolic gesture, that is to say belonging to class $C_5$, then the shape classification module 14 is invoked to recognize the trajectory of the gesture and associate a symbol with it.

Figure 3:
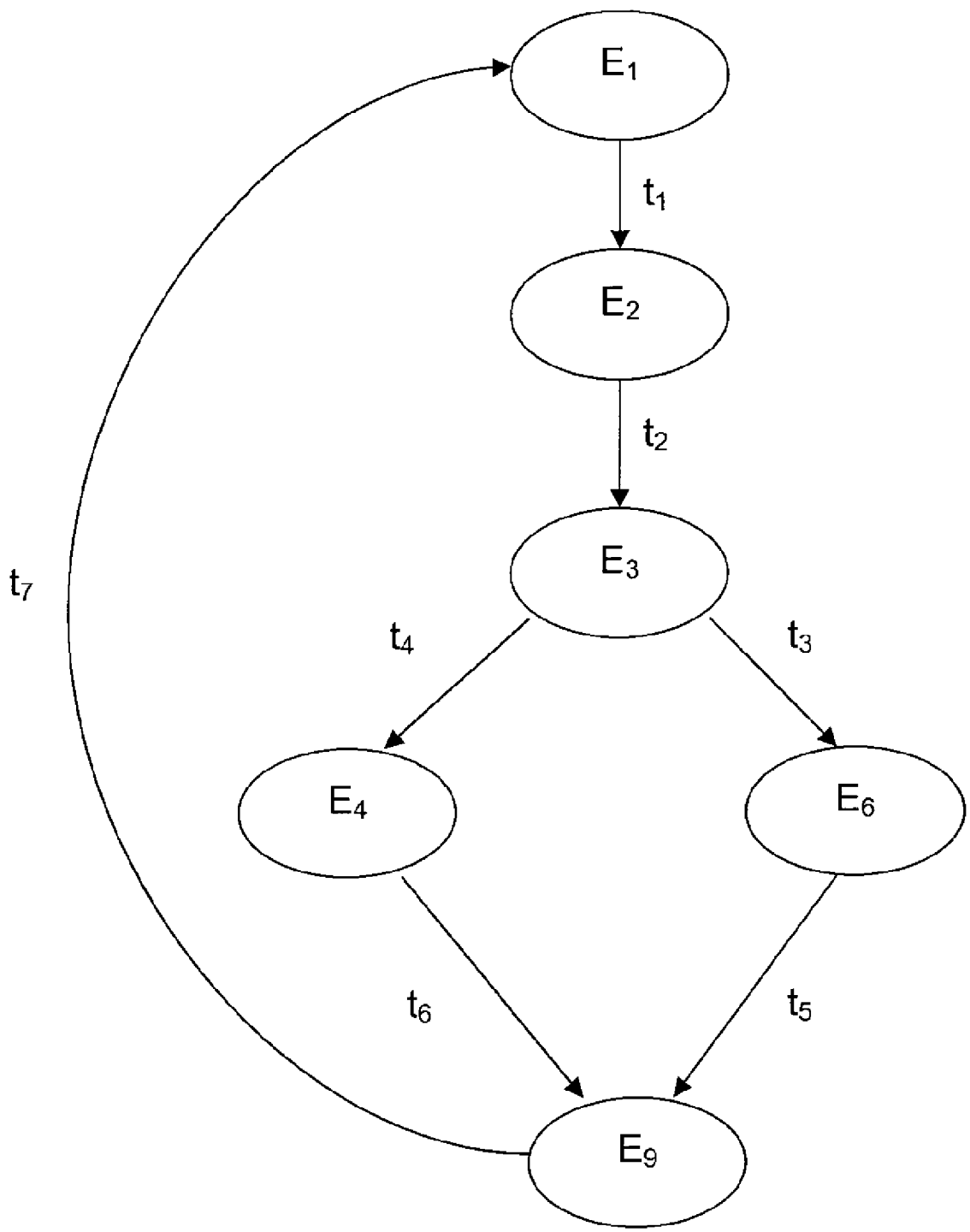
FIG. 3 illustrates two examples of classifying gestures according to the invention.

FIG. 3 illustrates two examples of classification of gestures by the meta-classification module (13).

With reference to FIG. 3, the ovals represent the states used for these two examples namely $E_1$ (ready), $E_2$ (movement), $E_3$ (analysis), $E_4$ (regular movement), $E_6$ (fast curved movement) and $E_9$ (end of gesture).

The arrows represent the connections between these states.

The expressions $t_i$, with i varying from 1 to 7, represent the transition conditions to be satisfied to switch from one state to another.

A transition $t_i$, with i varying from 1 to 7, is equal to 1 if the conditions for switching from the previous state to the following state are satisfied, to 0 otherwise.

With reference to FIG. 3, the transition condition $t_1$ corresponds to the detection of a movement. There is movement when the instantaneous curvilinear speed ($V_{inst}$) is greater than a certain threshold ($SH_0$), i.e. $V_{inst} > SH_0$.

If this criterion is satisfied, then $t_1=1$ and the automaton switches to the state $E_2$ (movement).

From this moment onwards, if the information available about the movement undergoing execution is not sufficient and if no other transition condition (these transitions not being represented in FIG. 3) is satisfied then the transition condition $t_2$ is satisfied ($t_2=1$) and the automaton switches to the transient state $E_3$ (analysis).

The transition condition $t_3$ is satisfied if a fast and curved gesture is detected. The detection of a curved gesture is performed on the basis of the analysis of the instantaneous tangential speed. If $t_3=1$ then the automaton switches to the state $E_6$ (fast curved movement). A fast and curved gesture corresponds to an asynchronous gesture and more particularly to a symbolic gesture. The automaton can remain in the state $E_6$ (fast curved movement) as long as no other transition condition is satisfied, in particular, as long as the transition condition $t_5$ is not satisfied.

The transition condition $t_4$ is satisfied if a slow and regular gesture is detected. For this purpose, it is necessary that the transition condition $t_3$ is not satisfied nor any other transition condition and that the curvilinear mean acceleration $Y_{moy}$ is negative, that is to say $Y_{moy}<0$. Specifically, it is considered that in the case of a slow and regular movement the curvilinear speed of the gesture fluctuates about a mean value thereby implying that the acceleration changes sign in the course of time (positive at the outset then negative).

If the transition condition $t_4$ is satisfied then the automaton switches to the state $E_4$ (regular movement). A regular gesture corresponds to a synchronous gesture.

If the transition condition $t_5$ or $t_6$ is satisfied then the automaton switches to the state $E_9$ (end of gesture). The switch to the state $E_9$ (end of gesture) is based, for example, on one of the following criteria: the lifting of a stylus or finger or a very low or zero mean speed or else the releasing of a pointing peripheral button.

The transition condition $t_7$ still being satisfied, the automaton returns to its initial state, namely $E_1$ (ready).

The series of states $E_1 \rightarrow E_2 \rightarrow E_3 \rightarrow E_4$ makes it possible to analyse the trajectory of the gesture and to determine that the latter corresponds to a prolonged regular movement. In this case, it is not necessary to wait for the switch to the state $E_9$ (end of gesture) in order to determine the class of the gesture. Consequently, class $C_1$ is obtained at the output of the meta-classification module 13.

The series of states $E_1 \rightarrow E_2 \rightarrow E_3 \rightarrow E_6 \rightarrow E_9$ makes it possible to determine that the gesture executed corresponds to a symbolic gesture. Consequently, class $C_5$ is obtained at the output of the meta-classification module 13.

Figure 4:
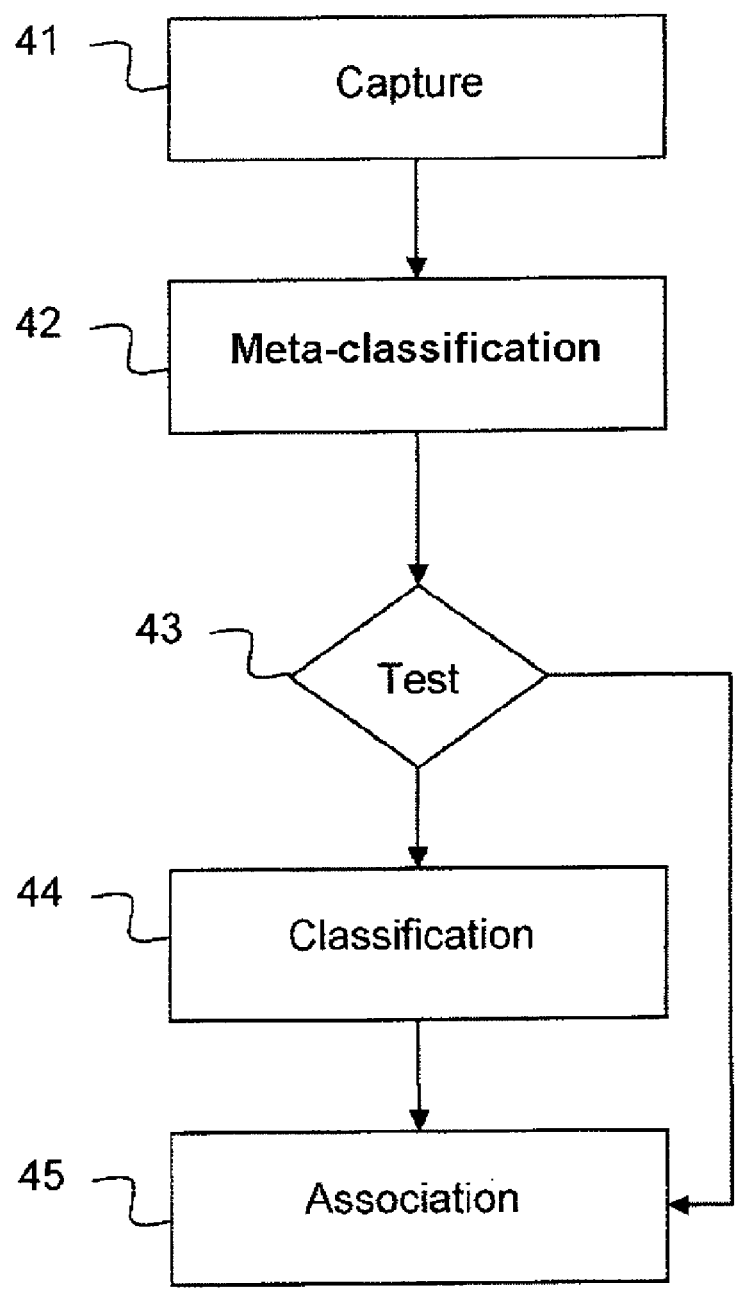
FIG. 4 represents an exemplary method of classifying gestures according to the invention.

FIG. 4 represents an exemplary method of classifying gestures according to the invention.

The method of classifying gestures according to the invention comprises a step 41 of capturing in real time a gesture executed by a user on a surface or in a graphical interface.

The capture of the gesture undergoing execution is carried out by the capture device 12.

The following step 42 is a meta-classification step. In the course of this step 42, the trajectory, given by kinematic and spatial characteristics, of the gesture undergoing execution captured in the previous step is analysed in real time, and the class of synchronous gestures or of asynchronous gestures to which the gesture undergoing execution belongs is determined.

Step 42 is carried out by the meta-classification module 13 described above.

The following step 43 is a test of the nature of the class determined in step 42.

If the class determined in step 42 corresponds to a symbolic gesture then the recognition of the trajectory of the complete gesture captured is carried out in the course of step 44, the shape classification step. This involves identifying the symbol associated with the complete gesture in a set of symbols, a symbol corresponding to a possible trajectory.

Step 44 is carried out by the shape classification module 14.

The following step 45 of action association is carried out by the actions controller 15 described above. In the course of step 45, an action to be executed is associated with the class or with the symbol obtained respectively on completion of step 42 or of step 44.

This action is carried out in response to the gesture executed by the user.

The invention also relates to a computer program for a system for classifying gestures comprising software instructions for executing, via the system, the method described above. The computer program can be stored in or transmitted by a data medium. The latter can be a hardware storage medium, for example a CD-ROM, a magnetic diskette or a hard disk, or even a transmissible medium such as an electrical, optical or radio signal.

The system 10 for classifying gestures can be integrated into a terminal such as a mobile tablet, PDA (for Personal Digital Assistant), mobile terminal, micro-computer, or else into any terminal implementing gestural interactions between a user and a surface or a graphical interface of this terminal.

The invention claimed is:

1. A system for classifying gestures executed by a user on a surface or in a graphical interface, the system comprising a meta-classification module which jointly analyzes kinematic and spatial characteristics of an arbitrary gesture undergoing execution, wherein the gesture comprises characteristics of at least acceleration and curvature, and classifies this gesture based on both characteristics into a class belonging to a group of classes comprising:
   class C1 comprising gestures corresponding to prolonged regular movement, of low speed, low acceleration, prolonged duration, and indeterminate shape;
   class C2 comprising gestures corresponding to rectilinear fast movement, of high acceleration, brief duration, and quasi-rectilinear shape;
   one of class C3 or class C4, wherein:
      class C3 comprises gestures corresponding to rotational movement to the left, more or less curved at the outset with a low or high acceleration, transforming into a fairly fast rotation to the left or to the right, and
      class C4 comprises gestures corresponding to rotational movement to the right, more or less curved at the outset with a low or high acceleration, transforming into a fairly fast rotation to the left or to the right; and
   class C5 comprising gestures with a high acceleration at the outset, and at least one curvature or at least one angle;
   wherein:
      class C1 corresponds to a class of direct manipulation synchronous gestures,
      class C2 corresponds to a class of asynchronous gestures,
      class C3 and class C4 wherein each corresponds to a class of dynamic gestures, and
      class C5 corresponds to a class of symbolic gestures.

2. A method of classifying gestures executed by a user on a surface or in a graphical interface, the method comprising a meta-classification step comprising the analysis of kinematic and spatial characteristics of an arbitrary gesture undergoing execution, wherein the gesture comprises characteristics of at least acceleration and curvature, and the classification of this gesture based on both characteristics into a class belonging to a group of classes comprising:
   class C1 comprising gestures corresponding to prolonged regular movement, of low speed, low acceleration, prolonged duration, and indeterminate shape;
   class C2 comprising gestures corresponding to rectilinear fast movement, of high acceleration, brief duration, and quasi-rectilinear shape;
   one of class C3 or class C4, wherein:
      class C3 comprises gestures corresponding to rotational movement to the left, more or less curved at the outset with a low or high acceleration, transforming into a fairly fast rotation to the left or to the right, and
      class C4 comprises gestures corresponding to rotational movement to the right, more or less curved at the outset with a low or high acceleration, transforming into a fairly fast rotation to the left or to the right; and
   class C5 comprising gestures with a high acceleration at the outset, and at least one curvature or at least one angle;
   wherein:
      class C1 corresponds to a class of direct manipulation synchronous gestures,
      class C2 corresponds to a class of asynchronous gestures,
      class C3 and class C4 wherein each corresponds to a class of dynamic gestures, and
      class C5 corresponds to a class of symbolic gestures.

3. A non-transitory computer program product, comprising a computer usable medium having a computer readable program code embodied therein, said computer readable program code adapted to be executed to implement the method of classifying gestures, according to claim 2.

4. A terminal comprising the system for classifying gestures according to claim 1.

* * * * *